US010609743B2

(12) United States Patent
Li et al.

(10) Patent No.: US 10,609,743 B2
(45) Date of Patent: Mar. 31, 2020

(54) D2D DATA TRANSMISSION METHOD AND SYSTEM, AND DEVICE

(71) Applicant: Huawei Technologies Co., Ltd., Shenzhen (CN)

(72) Inventors: Xiaocui Li, Beijing (CN); Kai Xu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/758,613

(22) PCT Filed: Sep. 11, 2015

(86) PCT No.: PCT/CN2015/089439
§ 371 (c)(1),
(2) Date: Mar. 8, 2018

(87) PCT Pub. No.: WO2017/041293
PCT Pub. Date: Mar. 16, 2017

(65) Prior Publication Data
US 2018/0249520 A1    Aug. 30, 2018

(51) Int. Cl.
*H04W 76/14*    (2018.01)
*H04W 8/00*    (2009.01)
(Continued)

(52) U.S. Cl.
CPC .......... *H04W 76/14* (2018.02); *H04W 8/005* (2013.01); *H04W 40/22* (2013.01); *H04W 48/20* (2013.01);
(Continued)

(58) Field of Classification Search
CPC ..... H04W 76/14; H04W 72/04; H04W 8/005; H04W 40/22; H04W 92/18; H04W 88/04;
(Continued)

(56) References Cited

U.S. PATENT DOCUMENTS 9,713,072 B2 * 7/2017 Liao ................. H04W 4/023
2008/0130540 A1 6/2008 Singh et al.
(Continued)

FOREIGN PATENT DOCUMENTS

CN    103607750 A    2/2014
CN    103974288 A    8/2014
(Continued)

OTHER PUBLICATIONS

Machine Translation and Abstract of Chinese Publication No. CN103607750, Feb. 26, 2014, 18 pages.
(Continued)

*Primary Examiner* — Brandon J Miller
(74) *Attorney, Agent, or Firm* — Conley Rose, P.C.

(57) ABSTRACT

A device-to-device (D2D) data transmission method and system, where the method implemented by a source terminal and includes sending a first message to n candidate terminals, where the first message discovers the n candidate terminals, the source terminal is out of a network coverage area of a base station, and the n candidate terminals are in the network coverage area of the base station, receiving n second messages from each candidate terminal, wherein each second message includes at least one of a user identity of each candidate terminal or status information of each candidate terminal, determining a relay terminal from the n candidate terminals according to at least one of the user identity of each candidate terminal or the status information of each candidate terminal, and transmitting the data to the base station using the relay terminal.

15 Claims, 8 Drawing Sheets

(51) Int. Cl.
*H04W 40/22* (2009.01)
*H04W 48/20* (2009.01)
*H04W 72/04* (2009.01)
*H04W 88/04* (2009.01)
*H04W 92/18* (2009.01)

(52) U.S. Cl.
CPC ......... *H04W 72/042* (2013.01); *H04W 88/04* (2013.01); *H04W 92/18* (2013.01); *Y02D 70/1262* (2018.01); *Y02D 70/1264* (2018.01); *Y02D 70/20* (2018.01); *Y02D 70/21* (2018.01); *Y02D 70/39* (2018.01)

(58) Field of Classification Search
CPC ... H04W 48/20; Y02D 70/39; Y02D 70/1262; Y02D 70/1264; Y02D 70/20; Y02D 70/21
See application file for complete search history.

(56) References Cited

U.S. PATENT DOCUMENTS

| | | | | |
|---|---|---|---|---|
| 2008/0134271 | A1* | 6/2008 | Qin | H04W 52/50 725/118 |
| 2008/0188177 | A1* | 8/2008 | Tan | H04B 7/2606 455/11.1 |
| 2012/0163252 | A1 | 6/2012 | Ahn et al. | |
| 2013/0294331 | A1* | 11/2013 | Wang | H04B 7/155 370/315 |
| 2014/0044036 | A1 | 2/2014 | Kim et al. | |
| 2014/0112162 | A1* | 4/2014 | Tavildar | H04W 48/08 370/252 |
| 2014/0307611 | A1 | 10/2014 | Tesanovic et al. | |
| 2015/0029866 | A1 | 1/2015 | Liao et al. | |
| 2015/0038136 | A1 | 2/2015 | Wu et al. | |
| 2015/0045050 | A1* | 2/2015 | Sartori | H04W 72/0446 455/452.1 |
| 2015/0172387 | A1* | 6/2015 | Ge | H04W 4/70 370/254 |
| 2015/0230180 | A1* | 8/2015 | Lim | H04W 52/0235 370/311 |
| 2015/0271861 | A1* | 9/2015 | Li | H04W 56/001 455/426.1 |
| 2016/0150390 | A1 | 5/2016 | Chen et al. | |
| 2016/0269486 | A1* | 9/2016 | Gupta | H04L 67/12 |
| 2016/0285539 | A1 | 9/2016 | Sadiq et al. | |
| 2017/0251507 | A1* | 8/2017 | Fodor | H04W 76/14 |
| 2018/0270843 | A1* | 9/2018 | Jiang | H04L 67/04 |

FOREIGN PATENT DOCUMENTS

| | | |
|---|---|---|
| CN | 104105103 A | 10/2014 |
| CN | 104105155 A | 10/2014 |
| CN | 104540236 A | 4/2015 |
| CN | 104703224 A | 6/2015 |
| EP | 2833694 A2 | 2/2015 |
| EP | 3270634 A1 | 1/2018 |
| EP | 3275274 | 1/2018 |
| WO | 2014063092 A1 | 4/2014 |
| WO | 2016153807 A1 | 9/2016 |

OTHER PUBLICATIONS

Wen, G., "A Study of Relay Selection Algorithms Based on D2D Communication," Nanjing University of Posts and Telecommunications, Jun. 15, 2013, 64 pages.
Partial English Translation of Wen, G., "A Study of Relay Selection Algorithms Based on D2D Communication," Nanjing University of Posts and Telecommunications, Jun. 15, 2013, 9 pages.
Foreign Communication From a Counterpart Application, PCT Application No. PCT/CN2015/089439, English Translation of International Search Report dated May 27, 2016, 2 pages.
Foreign Communication From a Counterpart Application, PCT Application No. PCT/CN2015/089439, English Translation of Written Opinion dated May 27, 2016, 6 pages.
Alcatel-Lucent, et al., "D2D system design enhancement to support out-of-coverage and partial coverage discovery for UE-network relays," R1-151328, 3GPP TSG RAN WG1 Meeting #80bis, XP050949882, Apr. 20-24 2015, 4 pages.
XP050972112 R2-152462 Ericsson, "Signalling required for UE-NW relay selection", R2-152462, 3GPP TSG-RAN WG2 #90, XP050972112, May 25-29, 2015, 17 pages.
Foreign Communication From a Counterpart Application, European Application No. 15903399.2, Extended European Search Report dated Jul. 17, 2018, 13 pages.
Machine Translation and Abstract of Chinese Publication No. CN103974288, Aug. 6, 2014, 15 pages.
Machine Translation and Abstract of Chinese Publication No. CN104540236, Apr. 22, 2015, 30 pages.
Machine Translation and Abstract of Chinese Publication No. CN104703224, Jun. 10, 2015, 27 pages.
Foreign Communication From a Counterpart Application, Chinese Application No. 201580081487.3, Chinese Office Action dated Jul. 2, 2019, 10 pages.
Foreign Communication From A Counterpart Application, Chinese Application No. 201580081487.3, Chinese Office Action dated Jan. 3, 2020, 11 pages.

\* cited by examiner

D2D DATA TRANSMISSION METHOD AND SYSTEM, AND DEVICE

CROSS-REFERENCE TO RELATED APPLICATIONS

This application is a U.S. National Stage of International Patent Application No. PCT/CN2015/089439 filed on Sep. 11, 2015, which is hereby incorporated by reference in its entirety.

TECHNICAL FIELD

The present disclosure relates to the field of wireless communications, and in particular, to a device-to-device (D2D) data transmission method and system, and a device.

BACKGROUND

With continuous development of wireless communications system technologies, to implement communication, a D2D communication mode may be further used in addition to a conventional cellular communication mode. In the cellular mode, user equipment (UE) communicates with another UE using a base station. However, in the D2D communication mode, UE directly communicates with another UE such that not only a radio spectrum resource is saved, but also pressure on a core network is reduced. Therefore, a D2D technology becomes an important technology that is currently being standardized in the 3rd Generation Partnership Project (3GPP) standard and that can be compatible with the 5th Generation (5G).

Currently, enhanced D2D (eD2D) is a topic being studied in the 3GPP Long Term Evolution (LTE) system release.13 (Rel.13). In this topic, UE-to-network relays are an important research orientation. The UE-to-network relays are classified into two scenarios, communication and discovery. For the two scenarios, a specific communication process, resource allocation, data transmission, and the like need to be designed and studied correspondingly.

Currently, how to find UE in network coverage that can be used as relay UE to transmit information from UE out of network coverage to a base station becomes an urgent problem to be resolved.

SUMMARY

Embodiments of the present disclosure provide a D2D data transmission method and system, and a device in order to resolve a problem about how to find UE in network coverage that can be used as relay UE to transmit information from UE out of network coverage to a base station.

To achieve the foregoing objective, the following technical solutions are used in the embodiments of the present disclosure.

According to a first aspect, a D2D data transmission method is provided, where the method includes sending, by source UE, a first message to n candidate UEs, where the first message is used to indicate that the source UE needs to transmit data to a base station, the source UE is UE out of a network coverage area of the base station, the n candidate UEs are UEs in the network coverage area of the base station, and n is an integer not less than 2, receiving, by the source UE, n second messages from the n candidate UEs, where each of the n candidate UEs sends one second message to the source UE, and the second message includes a user identity of each candidate UE and/or status information of each candidate UE, determining, by the source UE, relay UE from the n candidate UEs according to the user identity of each candidate UE and/or the status information of each candidate UE, where the relay UE is UE that transmits the data to the base station; and transmitting, by the source UE, the data to the base station using the relay UE.

With reference to the first aspect, in a first possible implementation of the first aspect, sending, by source UE, a first message to n candidate UEs includes sending, by the source UE in a resource pool preconfigured by the base station, the first message to the n candidate UEs, and receiving, by the source UE, n second messages from the n candidate UEs includes receiving, by the source UE in the resource pool, the n second messages from the n candidate UEs.

With reference to the first possible implementation of the first aspect, in a second possible implementation of the first aspect, the resource pool includes a first resource and a second resource, the first resource is allocated to and used by the source UE to send the first message and receive the second message, and the second resource is allocated to and used by the n candidate UEs to send the second message and receive the first message.

With reference to the first aspect, or the first possible implementation of the first aspect, or the second possible implementation of the first aspect, in a third possible implementation of the first aspect, the status information includes at least one or any combination of the following information, current memory usage, current power supply usage or remaining power, a processing capability of a central processing unit (CPU), a link status between the UE and the base station, or interference.

With reference to any one of the first aspect, or the first to the third possible implementations of the first aspect, in a fourth possible implementation of the first aspect, the first message includes an indication that the n candidate UEs need to feed back information.

With reference to any one of the first aspect, or the first to the fourth possible implementations of the first aspect, in a fifth possible implementation of the first aspect, the first message includes a preset threshold that the status information of the n candidate UEs needs to meet.

According to a second aspect, source UE is provided, where the source UE includes a sending unit, a receiving unit, and a processing unit, where the sending unit is configured to send a first message to n candidate UEs, where the first message is used to indicate that the source UE needs to transmit data to a base station, the source UE is UE out of a network coverage area of the base station, the n candidate UEs are UEs in the network coverage area of the base station, and n is an integer not less than 2. The receiving unit is configured to receive n second messages from the n candidate UEs, where each of the n candidate UEs sends one second message to the source UE, and the second message includes a user identity of each candidate UE and/or status information of each candidate UE. The processing unit is configured to determine relay UE from the n candidate UEs according to the user identity of each candidate UE and/or the status information of each candidate UE, where the relay UE is UE that transmits the data to the base station, and the sending unit is further configured to transmit the data to the base station using the relay UE.

With reference to the second aspect, in a first possible implementation of the second aspect, the sending unit is further configured to send, in a resource pool preconfigured by the base station, the first message to the n candidate UEs, and the receiving unit is further configured to receive, in the resource pool, the n second messages from the n candidate UEs.

With reference to the first possible implementation of the second aspect, in a second possible implementation of the second aspect, the resource pool includes a first resource and a second resource, the first resource is allocated to and used by the source UE to send the first message and receive the second message, and the second resource is allocated to and used by the n candidate UEs to send the second message and receive the first message.

With reference to the second aspect, or the first possible implementation of the second aspect, or the second possible implementation of the second aspect, in a third possible implementation of the second aspect, the status information includes at least one or any combination of the following information, current memory usage, current power supply usage or remaining power, a processing capability of a CPU, a link status between the UE and the base station, or interference.

With reference to any one of the second aspect, or the first to the third possible implementations of the second aspect, in a fourth possible implementation of the second aspect, the first message includes an indication that the n candidate UEs need to feed back information.

With reference to any one of the second aspect, or the first to the fourth possible implementations of the second aspect, in a fifth possible implementation of the second aspect, the first message includes a preset threshold that the status information of the n candidate UEs needs to meet.

According to a third aspect, source UE is provided, where the source UE includes a processor, a first interface circuit, a second interface circuit, a memory, and a bus, and the processor, the first interface circuit, the second interface circuit, and the memory are connected and complete mutual communication using the bus. The first interface circuit is configured to send a first message to n candidate UEs, where the first message is used to indicate that the source UE needs to transmit data to a base station, the source UE is UE out of a network coverage area of the base station, the n candidate UEs are UEs in the network coverage area of the base station, and n is an integer not less than 2. The second interface circuit is configured to receive n second messages from the n candidate UEs, where each of the n candidate UEs sends one second message to the source UE, and the second message includes a user identity of each candidate UE and/or status information of each candidate UE. The processor is configured to determine relay UE from the n candidate UEs according to the user identity of each candidate UE and/or the status information of each candidate UE, where the relay UE is UE that transmits the data to the base station, and the first interface circuit is further configured to transmit the data to the base station using the relay UE.

With reference to the third aspect, in a first possible implementation of the third aspect, the first interface circuit is further configured to send, in a resource pool preconfigured by the base station, the first message to the n candidate UEs, and the second interface circuit is further configured to receive, in the resource pool, the n second messages from the n candidate UEs.

With reference to the first possible implementation of the third aspect, in a second possible implementation of the third aspect, the resource pool includes a first resource and a second resource, the first resource is allocated to and used by the source UE to send the first message and receive the second message, and the second resource is allocated to and used by the n candidate UEs to send the second message and receive the first message.

With reference to the third aspect, or the first possible implementation of the third aspect, or the second possible implementation of the third aspect, in a third possible implementation of the third aspect, the status information includes at least one or any combination of the following information, current memory usage, current power supply usage or remaining power, a processing capability of a CPU, a link status between the UE and the base station, or interference.

With reference to any one of the third aspect, or the first to the third possible implementations of the third aspect, in a fourth possible implementation of the third aspect, the first message includes an indication that the n candidate UEs need to feed back information.

With reference to any one of the third aspect, or the first to the fourth possible implementations of the third aspect, in a fifth possible implementation of the third aspect, the first message includes a preset threshold that the status information of the n candidate UEs needs to meet.

According to the D2D data transmission method and the source UE out of the network coverage area of the base station provided in the embodiments of the present disclosure, after the source UE sends the first message to the n candidate UEs in the network coverage area of the base station, the source UE receives the n second messages from the n candidate UEs. Each of the n candidate UEs sends one second message to the source UE, and the second message includes the user identity of each candidate UE and/or the status information of each candidate UE. In this way, the source UE may determine the relay UE from the n candidate UEs according to the user identity of each candidate UE and/or the status information of each candidate UE, and further transmit the data to the base station using the relay UE, where n is an integer not less than 2. That is, according to the D2D data transmission method and the source UE provided in the embodiments of the present disclosure, when there are a plurality of candidate UEs in network coverage, one suitable UE may be found from the plurality of candidate UEs and used as relay UE to transmit information from UE out of network coverage to a base station. Therefore, this resolves a problem about how to find UE in network coverage that can be used as relay UE to transmit information from UE out of network coverage to a base station.

According to a fourth aspect, a D2D data transmission method is provided, where the method includes receiving, by candidate UE, a first message sent by source UE, where the first message is used to indicate that the source UE needs to transmit data to a base station, the source UE is UE out of a network coverage area of the base station, the candidate UE is UE in n candidate UEs in the network coverage area of the base station, and n is an integer not less than 2, sending, by the candidate UE, a second message to the source UE, where the second message includes a user identity of the candidate UE and/or status information of the candidate UE, and receiving, by the candidate UE, the data sent by the source UE, and transmitting the data to the base station when the candidate UE is determined as relay UE by the source UE according to the user identity of the candidate UE and/or the status information of the candidate UE, where the relay UE is UE that transmits the data to the base station.

With reference to the fourth aspect, in a first possible implementation of the fourth aspect, receiving, by candidate UE, a first message sent by source UE includes receiving, by the candidate UE in a resource pool preconfigured by the base station, the first message sent by the source UE, and sending, by the candidate UE, a second message to the source UE includes sending, by the candidate UE in the resource pool, the second message to the source UE.

With reference to the first possible implementation of the fourth aspect, in a second possible implementation of the fourth aspect, the resource pool includes a first resource and a second resource, the first resource is allocated to and used by the source UE to send the first message and receive the second message, and the second resource is allocated to and used by the n candidate UEs to send the second message and receive the first message.

With reference to the fourth aspect, or the first possible implementation of the fourth aspect, or the second possible implementation of the fourth aspect, in a third possible implementation of the fourth aspect, the status information includes at least one or any combination of the following information, current memory usage, current power supply usage or remaining power, a processing capability of a CPU, a link status between the UE and the base station, or interference.

With reference to any one of the fourth aspect, or the first to the third possible implementations of the fourth aspect, in a fourth possible implementation of the fourth aspect, the first message includes an indication that the n candidate UEs need to feed back information.

With reference to any one of the fourth aspect, or the first to the fourth possible implementations of the fourth aspect, in a fifth possible implementation of the fourth aspect, the first message includes a preset threshold that status information of the n candidate UEs needs to meet.

According to a fifth aspect, candidate UE is provided, where the candidate UE includes a receiving unit and a sending unit, where the receiving unit is configured to receive a first message sent by source UE, where the first message is used to indicate that the source UE needs to transmit data to a base station, the source UE is UE out of a network coverage area of the base station, the candidate UE is UE in n candidate UEs in the network coverage area of the base station, and n is an integer not less than 2. The sending unit is configured to send a second message to the source UE, where the second message includes a user identity of the candidate UE and/or status information of the candidate UE. The receiving unit is further configured to receive the data sent by the source UE when the candidate UE is determined as relay UE by the source UE according to the user identity of the candidate UE and/or the status information of the candidate UE, where the relay UE is UE that transmits the data to the base station, and the sending unit is further configured to transmit the data to the base station.

With reference to the fifth aspect, in a first possible implementation of the fifth aspect, the receiving unit is further configured to receive, in a resource pool preconfigured by the base station, the first message sent by the source UE, and the sending unit is further configured to send, in the resource pool, the second message to the source UE.

With reference to the first possible implementation of the fifth aspect, in a second possible implementation of the fifth aspect, the resource pool includes a first resource and a second resource, the first resource is allocated to and used by the source UE to send the first message and receive the second message, and the second resource is allocated to and used by the n candidate UEs to send the second message and receive the first message.

With reference to the fifth aspect, or the first possible implementation of the fifth aspect, or the second possible implementation of the fifth aspect, in a third possible implementation of the fifth aspect, the status information includes at least one or any combination of the following information, current memory usage, current power supply usage or remaining power, a processing capability of a CPU, a link status between the UE and the base station, or interference.

With reference to any one of the fifth aspect, or the first to the third possible implementations of the fifth aspect, in a fourth possible implementation of the fifth aspect, the first message includes an indication that the n candidate UEs need to feed back information.

With reference to any one of the fifth aspect, or the first to the fourth possible implementations of the fifth aspect, in a fifth possible implementation of the fifth aspect, the first message includes a preset threshold that status information of the n candidate UEs needs to meet.

According to a sixth aspect, candidate UE is provided, where the candidate UE includes a first interface circuit, a second interface circuit, a memory, and a bus, and the first interface circuit, the second interface circuit, and the memory are connected and complete mutual communication using the bus. The first interface circuit is configured to receive a first message sent by source UE, where the first message is used to indicate that the source UE needs to transmit data to a base station, the source UE is UE out of a network coverage area of the base station, the candidate UE is UE in n candidate UEs in the network coverage area of the base station, and n is an integer not less than 2. The second interface circuit is configured to send a second message to the source UE, where the second message includes a user identity of the candidate UE and/or status information of the candidate UE. The first interface circuit is further configured to receive the data sent by the source UE when the candidate UE is determined as relay UE by the source UE according to the user identity of the candidate UE and/or the status information of the candidate UE, where the relay UE is UE that transmits the data to the base station, and the second interface circuit is further configured to transmit the data to the base station.

With reference to the sixth aspect, in a first possible implementation of the sixth aspect, the first interface circuit is further configured to receive, in a resource pool preconfigured by the base station, the first message sent by the source UE, and the second interface circuit is further configured to send, in the resource pool, the second message to the source UE.

With reference to the first possible implementation of the sixth aspect, in a second possible implementation of the sixth aspect, the resource pool includes a first resource and a second resource, the first resource is allocated to and used by the source UE to send the first message and receive the second message, and the second resource is allocated to and used by the n candidate UEs to send the second message and receive the first message.

With reference to the sixth aspect, or the first possible implementation of the sixth aspect, or the second possible implementation of the sixth aspect, in a third possible implementation of the sixth aspect, the status information includes at least one or any combination of the following information, current memory usage, current power supply usage or remaining power, a processing capability of a CPU, a link status between the UE and the base station, or interference.

With reference to any one of the sixth aspect, or the first to the third possible implementations of the sixth aspect, in a fourth possible implementation of the sixth aspect, the first message includes an indication that the n candidate UEs need to feed back information.

With reference to any one of the sixth aspect, or the first to the fourth possible implementations of the sixth aspect, in a fifth possible implementation of the sixth aspect, the first message includes a preset threshold that status information of the n candidate UEs needs to meet.

According to the D2D data transmission method and the candidate UE in the network coverage area of the base station provided in the embodiments of the present disclosure, after receiving the first message sent by the source UE out of the network coverage area of the base station, the candidate UE sends the second message to the source UE, and the second message includes the user identity of the candidate UE and/or the status information of the candidate UE. In this way, after receiving second messages sent by the n candidate UEs, the source UE may determine the relay UE from the n candidate UEs according to the user identity of each candidate UE and/or the status information of each candidate UE, and further transmit the data to the base station using the relay UE, where n is an integer not less than 2. That is, according to the D2D data transmission method and the candidate UE provided in the embodiments of the present disclosure, when there are a plurality of candidate UEs in network coverage, one suitable UE may be found from the plurality of candidate UEs and used as relay UE to transmit information from UE out of network coverage to a base station. Therefore, this resolves a problem about how to find UE in network coverage that can be used as relay UE to transmit information from UE out of network coverage to a base station.

According to a seventh aspect, a D2D data transmission system is provided, where the system includes a base station, the source UE according to any one of the second aspect, and at least two candidate UEs according to any one of the third aspect, or a base station, the source UE according to any one of the fifth aspect, and at least two candidate UEs according to any one of the sixth aspect.

The D2D data transmission system provided in the embodiments of the present disclosure includes the source UE according to any one of the second aspect, and at least two candidate UEs according to any one of the third aspect, or the source UE according to any one of the fifth aspect, and at least two candidate UEs according to any one of the sixth aspect. Therefore, for technical effects that can be obtained by the D2D data transmission system, refer to the foregoing embodiments. Details are not described herein in the embodiments of the present disclosure.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
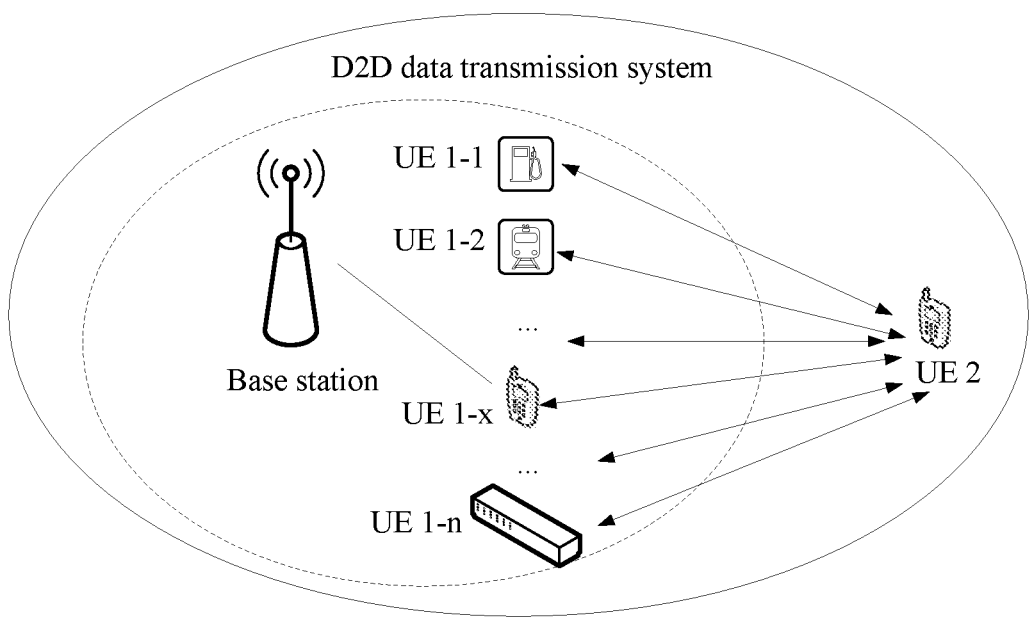
FIG. 1 is a schematic diagram of a scenario of a D2D data transmission system according to an embodiment of the present disclosure.

The following describes the technical solutions in the embodiments of the present disclosure with reference to the accompanying drawings in the embodiments of the present disclosure. The described embodiments are merely a part rather than all of the embodiments of the present disclosure. In the following descriptions, for a purpose of description instead of limitation, some specific details are described to facilitate clear understanding. In some embodiments, detailed descriptions of a well-known apparatus, circuit, and method are omitted in order to avoid blurred descriptions caused by unnecessary details. In the thorough descriptions, same reference numerals and same names refer to same or similar elements.

To facilitate clear description of the technical solutions in the embodiments of the present disclosure, words such as "first" and "second" are used in the embodiments of the present disclosure to distinguish between same items or similar items that provide basically same functions or purposes. Persons skilled in the art may understand that the words such as "first" and "second" do not limit a quantity and an execution order.

Embodiments of the present disclosure are mainly applied to a D2D data transmission system. Further, the D2D data transmission system may be an LTE or LTE Advanced (LTE-A) system, or may be an LTE system of future another release. This is not limited in the embodiments of the present disclosure. As shown in FIG. 1, the D2D data transmission system includes a base station, n candidate UEs (it is assumed that the n candidate UEs are denoted as n UEs 1, including UE 1-1, UE 1-2, . . . , and UE 1-n) in a network coverage area of the base station, and source UE (it is assumed that the source UE is denoted as UE 2) out of the network coverage area of the base station, where n is an integer not less than 2. The UE 2 may separately communicate with each of the n UEs 1, and UE 1-m (it is assumed that the UE 1-m is relay UE) may communicate with the base station, where $1 \leq m \leq n$ and m is an integer.

Figure 2:
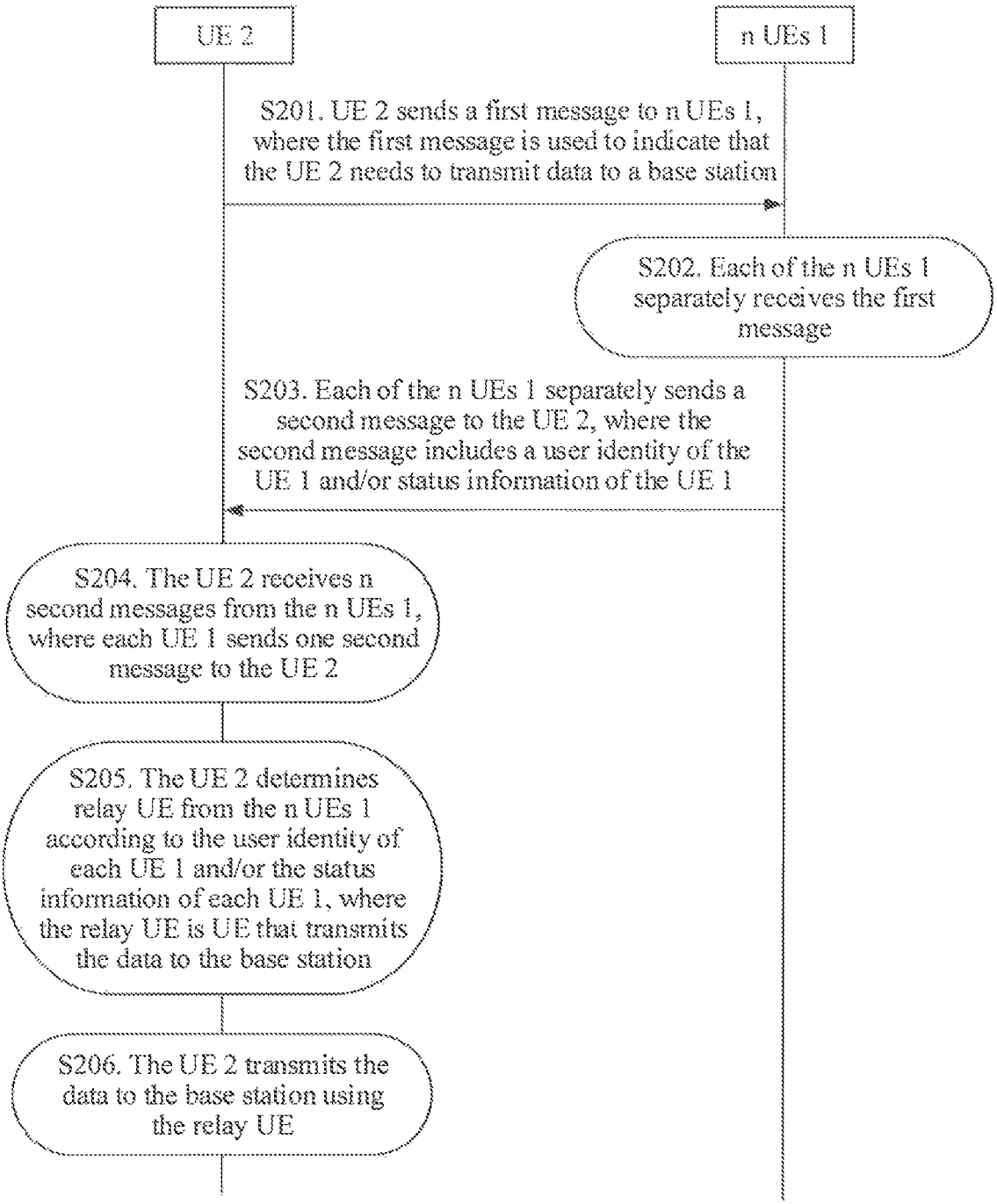
FIG. 2 is a first schematic interaction diagram of a D2D data transmission method according to an embodiment of the present disclosure.

Based on the D2D data transmission system shown in FIG. 1, an embodiment of the present disclosure provides a D2D data transmission method. As shown in FIG. 2, the method includes the following steps.

Step S201: UE 2 sends a first message to n UEs 1, where the first message is used to indicate that the UE 2 needs to transmit data to a base station.

Step S202: Each of the n UEs 1 separately receives the first message.

Step S203: Each of the n UEs 1 separately sends a second message to the UE 2, where the second message includes a user identity of the UE 1 and/or status information of the UE 1.

Further, in this embodiment of the present disclosure, the status information of the UE 1 includes information used to reflect a status of the UE 1. The status information includes at least one or any combination of the following information, current memory usage, current power supply usage or remaining power, a processing capability of a CPU, a link status between the UE and the base station, or interference.

It should be noted that "at least one" herein means that the status information may be any information or may be a combination of any information in the information such as the current memory usage, the current power supply usage or remaining power, the processing capability of the CPU, the link status between the UE and the base station, or the interference. For example, first information is the current memory usage, and the current power supply usage or remaining power; or first information is the link status between the UE and the base station, and the interference. This is not limited in this embodiment of the present disclosure.

The current memory usage generally refers to a current memory usage ratio or a current memory remaining ratio. For example, the current memory usage is the current memory usage ratio 60%.

The current power supply usage generally refers to a current power supply used ratio. For example, the current power supply usage is a current power supply used ratio 20%.

The current power supply remaining power generally refers to a current power supply remaining power ratio. For example, the current power supply remaining power is 20%.

The processing capability of the CPU means that in a unit of time, a capability of processing information by the CPU may be reflected by a speed of running a program by the CPU.

The link status between the UE and the base station includes a link stability status between the UE and the base station, interference between the UE and the base station, and the like. Generally, a specific link status may be reflected by a value of a downlink reference signal received power (RSRP) or a downlink signal to interference plus noise ratio (SINR).

The interference includes an interference or noise status of a link between the UE 2 and the UE 1.

Step S204: The UE 2 receives n second messages from the n UEs 1, where each UE 1 sends one second message to the UE 2.

Step S205: The UE 2 determines relay UE from the n UEs 1 according to the user identity of each UE 1 and/or the status information of each UE 1, where the relay UE is UE that transmits the data to the base station.

Further, in this embodiment of the present disclosure, that the UE 2 determines relay UE from the n UEs 1 according to the user identity of each UE 1 and/or the status information of each UE 1 may include the following.

The UE 2 determines the relay UE from the n UEs 1 according to the user identity of each UE 1 and/or the status information of each UE 1 and with reference to a preset policy.

For example, if the status information includes the current memory usage, the preset policy may include UE 1 that has a smallest current memory usage ratio is the relay UE, if the status information includes the current power supply remaining power, the preset policy may include UE 1 that has a highest current power supply remaining power is the relay UE, if the status information includes the processing capability of the CPU, the preset policy may include UE 1 whose CPU has a strongest processing capability is the relay UE, if the status information includes the link status between the UE and the base station, the preset policy may include UE 1 that has an optimal link status between the UE and the base station is the relay UE, if the status information includes the interference, the preset policy may include UE 1 with least interference is the relay UE, or if the status information includes the current memory usage and the current power supply remaining power, the preset policy may include UE 1 that is in UEs 1 whose current memory usage ratios are less than 60% and that has a highest current power supply remaining power is the relay UE.

Certainly, the preset policy may be other content, and the foregoing provides merely examples for description. This is not limited in this embodiment of the present disclosure.

Step S206: The UE 2 transmits the data to the base station using the relay UE.

After determining the relay UE, the UE 2 transmits the data to the base station using the relay UE.

Figure 3A:
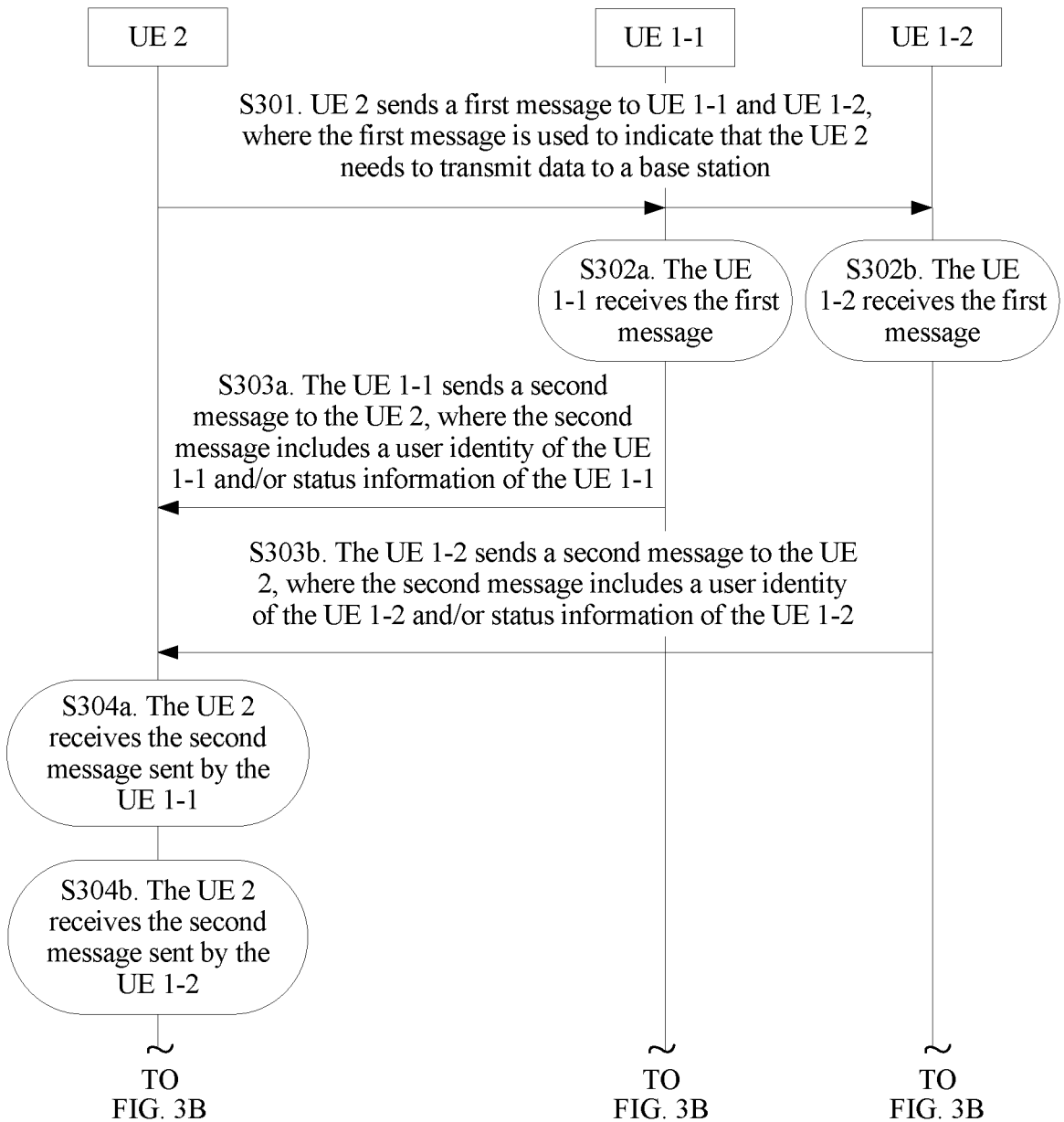
FIG. 3A and FIG. 3B are a second schematic interaction diagram of a D2D data transmission method according to an embodiment of the present disclosure.
Figure 3B:
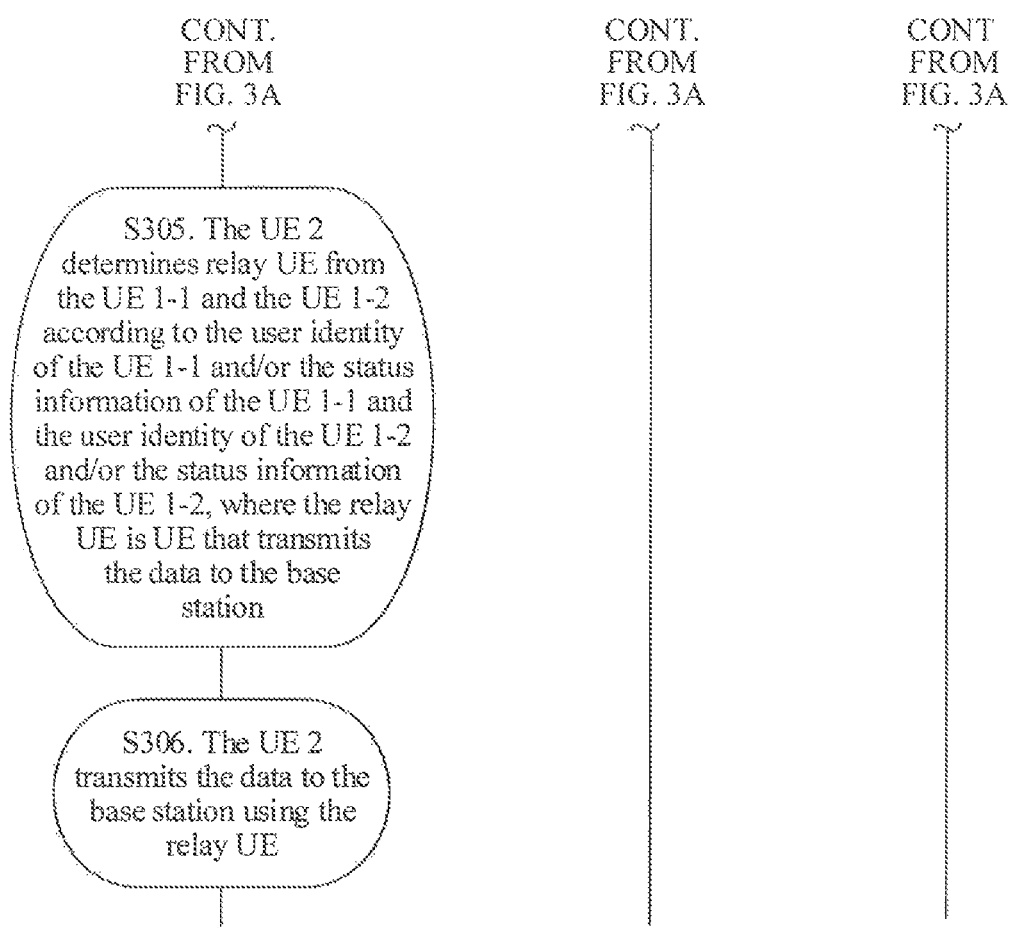

For example, the following uses n=2 as an example to describe in detail the D2D data transmission method shown in FIG. 2. As shown in FIG. 3A and FIG. 3B, the method includes the following steps.

Step S301: UE 2 sends a first message to UE 1-1 and UE 1-2, where the first message is used to indicate that the UE 2 needs to transmit data to a base station.

Step S302a: The UE 1-1 receives the first message.

Step S303a: The UE 1-1 sends a second message to the UE 2, where the second message includes a user identity of the UE 1-1 and/or status information of the UE 1-1.

Step S304a: The UE 2 receives the second message sent by the UE 1-1.

Step S302b: The UE 1-2 receives the first message.

Step S303b: The UE 1-2 sends a second message to the UE 2, where the second message includes a user identity of the UE 1-2 and/or status information of the UE 1-2.

Step S304b: The UE 2 receives the second message sent by the UE 1-2.

It should be noted that steps S302a to 304a and steps S302b to 304b are not necessarily performed in a specific order. Steps S302a to 304a may be performed before steps S302b to 304b, or steps S302b to 304b may be performed before steps S302a to 304a, or steps S302a to 304a and steps S302b to 304b may be simultaneously performed. This is not limited in this embodiment of the present disclosure.

In addition, for a related explanation of the status information in step S303a and step S303b, refer to related description in step S203 in the embodiment shown in FIG. 2. Details are not described herein.

Step S305: The UE 2 determines relay UE from the UE 1-1 and the UE 1-2 according to the user identity of the UE 1-1 and/or the status information of the UE 1-1 and the user identity of the UE 1-2 and/or the status information of the UE 1-2, where the relay UE is UE that transmits the data to the base station.

Further, for a specific implementation in which the UE 2 determines the relay UE from the UE 1-1 and the UE 1-2 according to the user identity of the UE 1-1 and/or the status information of the UE 1-1 and the user identity of the UE 1-2 and/or the status information of the UE 1-2, refer to related description in step S205 in the embodiment shown in FIG. 2. Details are not described herein.

Step S306: The UE 2 transmits the data to the base station using the relay UE.

It should be noted that the example shown in FIG. 3A and FIG. 3B is described using n=2 as an example. Certainly, n may be another integer greater than 2, and a similar implementation may be obtained by analogy according to the example shown in FIG. 3A and FIG. 3B. Details are not described in this embodiment of the present disclosure.

Based on the D2D data transmission method provided in this embodiment of the present disclosure, after the UE 2 (UE out of the network coverage area of the base station) sends the first message to the n UEs 1 (n candidate UEs in the network coverage area of the base station), each of the n UEs 1 separately sends the second message to the UE 2. The second message includes the user identity of the UE 1 and/or the status information of the UE 1. In this way, after receiving the n second messages from the n UEs 1, the UE 2 may determine the relay UE from the n UEs 1 according to the user identity of each of the n UEs 1 and/or the status information of each of the n UEs 1, and further transmit the data to the base station using the relay UE, where n is an integer not less than 2. That is, a solution below is provided. When there are usually a plurality of candidate UEs in network coverage, one suitable UE is found from the plurality of candidate UEs and used as relay UE to transmit information from UE out of network coverage to a base station. Therefore, this resolves a problem about how to find UE in network coverage that can be used as relay UE to transmit information from UE out of network coverage to a base station.

Further, to avoid interference from or to cell communication, the base station may configure one resource pool for the UE 2 and each of the n UEs 1. The UE 2 may receive and send a message in the resource pool, and each of the n UEs 1 may receive and send a message in the resource pool. That is, in the embodiment shown in FIG. 2, that UE 2 sends a first message to n UEs 1 (step S201) may include the following.

The UE 2 sends, in the resource pool preconfigured by the base station, the first message to then UEs 1.

That each of the n UEs 1 separately receives the first message (step S202) may include the following.

Each of the n UEs 1 separately receives the first message in the resource pool.

That each of the n UEs 1 separately sends a second message to the UE 2 (step S203) may include the following.

Each of the n UEs 1 separately sends, in the resource pool, the second message to the UE 2.

That the UE 2 receives n second messages from the n UEs 1 (step S204) may include the following.

The UE 2 receives, in the resource pool, the n second messages from the n UEs 1.

In order to avoid resource contention between the first message sent by the UE 2 and the n second messages sent by the n UEs 1, different resources in the resource pool preconfigured by the base station may be separately allocated to the UE 2 and the n UEs 1.

That is, the resource pool includes a first resource and a second resource, the first resource is allocated to and used by the UE 2 to send the first message and receive the second message, and the second resource is allocated to and used by the n UEs 1 to send the second message and receive the first message.

Further, in the foregoing embodiments, the first message may further include an indication that the n UEs 1 need to feed back information.

Further, that each of the n UEs 1 separately sends a second message to the UE 2 (step S203) may include the following.

Each of the n UEs 1 separately sends the second message to the UE 2 according to the indication that the n UEs 1 need to feed back information.

The indication for feeding back information may include that information that needs to be fed back by each of the n UEs 1 includes the status information. This is not limited in this embodiment of the present disclosure.

The first message further includes a preset threshold that the status information of the n UEs 1 needs to meet.

In this way, before each of the n UEs 1 separately sends the second message to the UE 2, the method may further include the following.

Each of the n UEs 1 determines, according to the preset threshold that the status information of the n UEs 1 needs to meet, whether the status information of the UE 1 accords with the preset threshold.

That each of the n UEs 1 separately sends a second message to the UE 2 may include the following.

If the status information of the UE 1 accords with the preset threshold, the UE 1 sends the second message to the UE 2.

Certainly, if the status information of the UE 1 does not meet the preset threshold, the UE 1 does not send the second message to the UE 2. This is not limited in this embodiment of the present disclosure.

If the status information includes current memory usage, the preset threshold may include that a current memory usage ratio is less than the preset threshold, if the status information includes a current power supply remaining power, the preset threshold may include that the current power supply remaining power is greater than the preset threshold, if the status information includes a processing capability of a CPU, the preset threshold may include that the processing capability of the CPU is greater than the preset threshold, if the status information includes a link status between the UE and the base station, the preset threshold may include that the link status between the UE and the base station is greater than the preset threshold, or if the status information includes interference, the preset threshold may include that interference is less than the preset threshold.

Certainly, for specific status information, the preset threshold may be other content, and the foregoing merely provides several possible preset thresholds. This is not limited in this embodiment of the present disclosure.

It should be noted that "the status information needs to meet the preset threshold" herein means that each piece of information in the status information needs to meet a respective preset threshold.

For example, it is assumed that the status information includes the current power supply remaining power and the current memory usage, a preset threshold of the current power supply remaining power is greater than or equal to 50%, and a preset threshold of the current memory usage is less than or equal to 40%. If the current power supply remaining power of UE 1-1 is 70%, and the current memory usage is 50%, in this case, the current memory usage in the status information of the UE 1-1 does not meet the preset threshold, and the second message is not to be sent to the UE 2. If the current power supply remaining power of UE 1-3 is 70%, and the current memory usage is 20%, in this case, the status information of the UE 1-3 accords with the preset threshold, and the second message is sent to the UE 2. Therefore, workload of selecting one suitable UE from a plurality of candidate UEs as relay UE by the UE 2 can be greatly reduced such that power consumption of the UE 2 is reduced, and signaling overheads are reduced.

Figure 4:
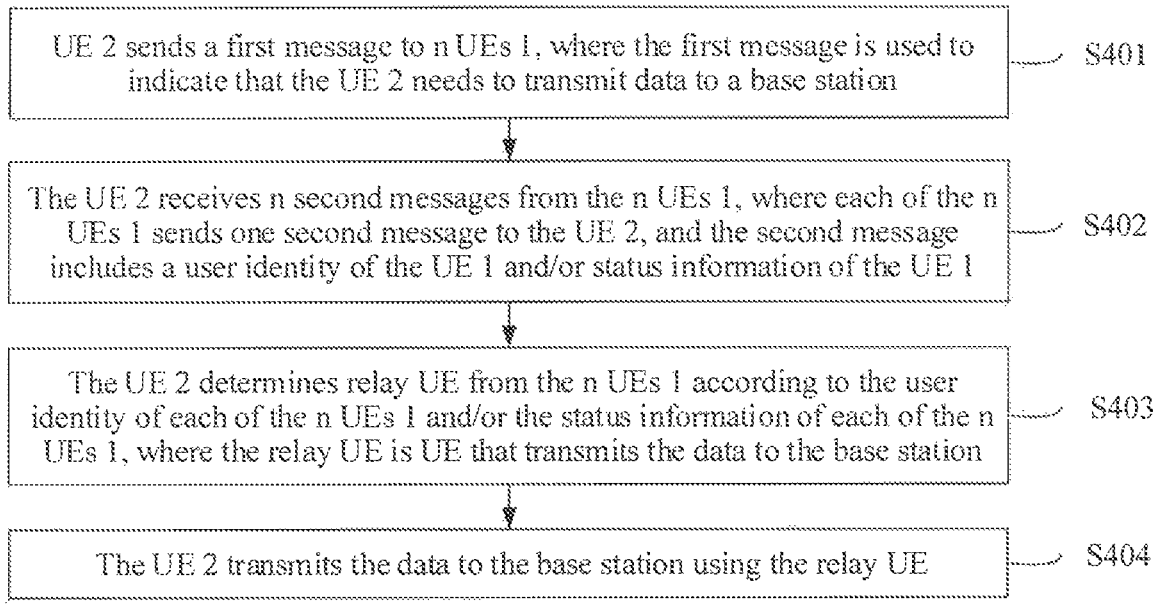
FIG. 4 is a first schematic flowchart of a D2D data transmission method according to an embodiment of the present disclosure.

Based on the D2D data transmission system shown in FIG. 1, an embodiment of the present disclosure further provides a D2D data transmission method. UE 2 is used as an execution body for description. As shown in FIG. 4, the method includes the following steps.

Step S401: The UE 2 sends a first message to n UEs 1, where the first message is used to indicate that the UE 2 needs to transmit data to a base station.

Step S402: The UE 2 receives n second messages from the n UEs 1, where each of the n UEs 1 sends one second message to the UE 2, and the second message includes a user identity of the UE 1 and/or status information of the UE 1.

Further, for a related explanation of the status information, refer to related description in step S203 in the embodiment shown in FIG. 2. Details are not described in this embodiment of the present disclosure.

Step S403: The UE 2 determines relay UE from the n UEs 1 according to the user identity of each of the n UEs 1 and/or the status information of each of the n UEs 1, where the relay UE is UE that transmits the data to the base station.

Further, for a specific implementation of step S403, refer to related description in step S205 in the embodiment shown in FIG. 2. Details are not described in this embodiment of the present disclosure.

Step S404: The UE 2 transmits the data to the base station using the relay UE.

Figure 5:
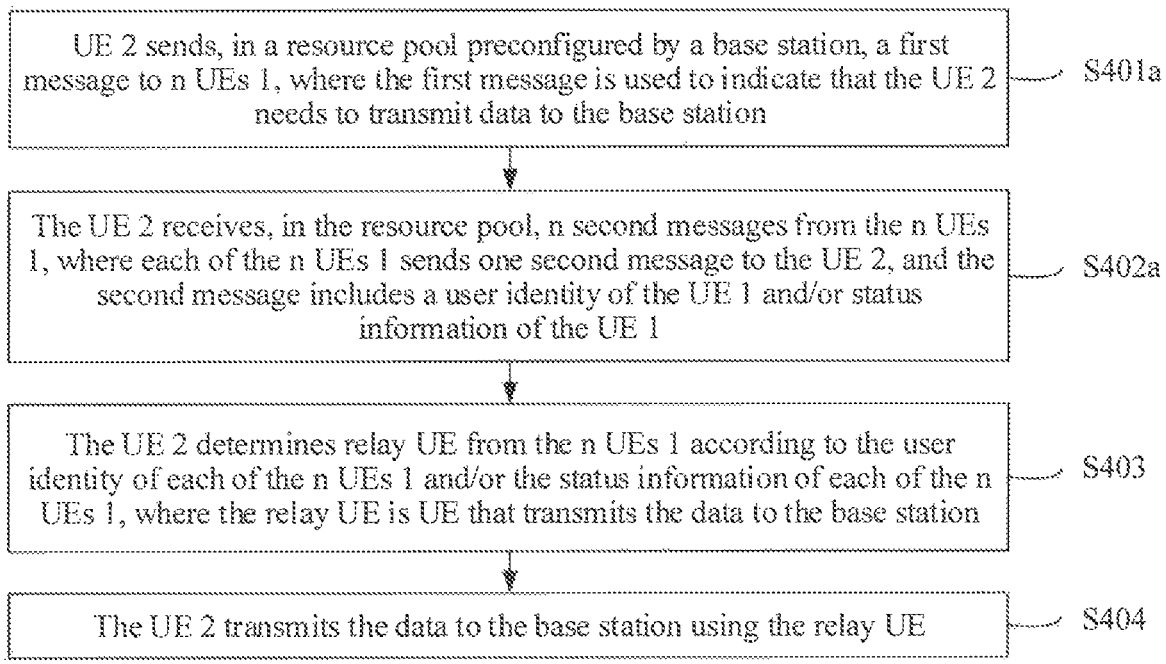
FIG. 5 is a second schematic flowchart of a D2D data transmission method according to an embodiment of the present disclosure.

Further, the base station may pre-configure a resource pool, and the UE 2 may receive and send a message in the resource pool. That is, as shown in FIG. 5, that the UE 2 sends a first message to n UEs 1 (step S401) may include the following step.

Step S401*a*: The UE 2 sends, in the resource pool preconfigured by the base station, the first message to the n UEs 1, where the first message is used to indicate that the UE 2 needs to transmit data to the base station.

That the UE 2 receives n second messages from the n UEs 1 (step S402) may include the following step.

Step S402*a*: The UE 2 receives, in the resource pool, the n second messages from the n UEs 1, where each of the n UEs 1 sends one second message to the UE 2, and the second message includes a user identity of the UE 1 and/or status information of the UE 1.

In order to avoid resource contention between the first message sent by the UE 2 and the n second messages sent by the n UEs 1, different resources in the resource pool preconfigured by the base station may be separately allocated to the UE 2 and the n UEs 1.

That is, the resource pool preconfigured by the base station includes a first resource and a second resource, the first resource is allocated to and used by the UE 2 to send the first message and receive the second message, and the second resource is allocated to and used by the n UEs 1 to send the second message and receive the first message.

Further, in the foregoing embodiments, the first message may further include an indication that the n UEs 1 need to feed back information.

The indication for feeding back information may be further that information that needs to be fed back by each of the n UEs 1 includes the status information. For related description, refer to the foregoing interaction embodiments. Details are not described in this embodiment of the present disclosure.

The first message further includes a preset threshold that the status information of the n UEs 1 needs to meet.

For related description and examples, refer to the foregoing interaction embodiments. Details are not described in this embodiment of the present disclosure.

Based on the D2D data transmission method provided in this embodiment of the present disclosure, after the UE 2 (UE out of the network coverage area of the base station) sends the first message to the n UEs 1 (n candidate UEs in the network coverage area of the base station), the UE 2 receives the n second messages from the n UEs 1. Each of the n UEs 1 sends one second message to the UE 2, and the second message includes the user identity of the UE 1 and/or the status information of the UE 1. In this way, the UE 2 may determine the relay UE from the n UEs 1 according to the user identity of each of the n UEs 1 and/or the status information of each of the n UEs 1, and further transmit the data to the base station using the relay UE, where n is an integer not less than 2. That is, a solution below is provided. When there are usually a plurality of candidate UEs in network coverage, one suitable UE is found from the plurality of candidate UEs and used as relay UE, to transmit information from UE out of network coverage to a base station. Therefore, this resolves a problem about how to find UE in network coverage that can be used as relay UE to transmit information from UE out of network coverage to a base station.

Figure 6:
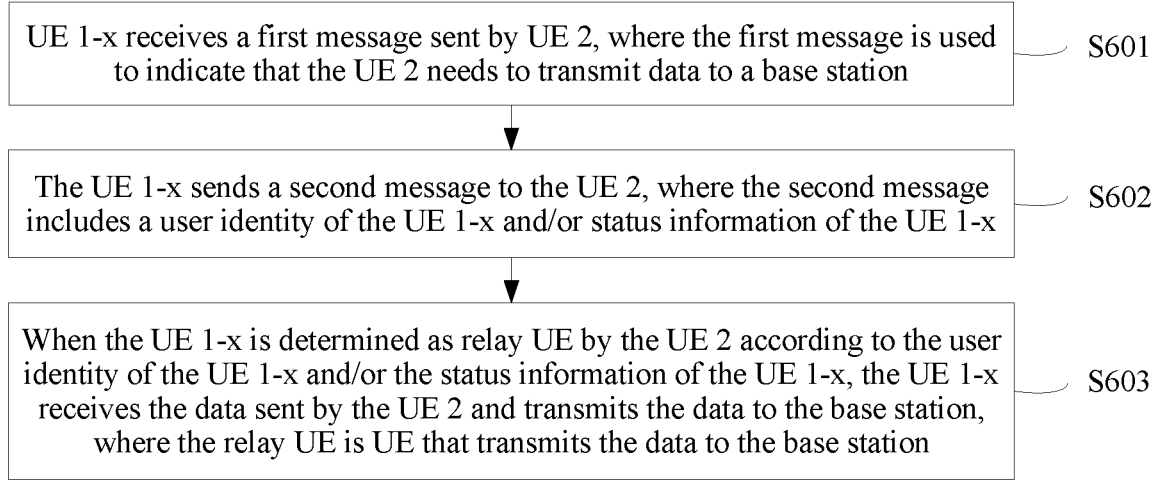
FIG. 6 is a third schematic flowchart of a D2D data transmission method according to an embodiment of the present disclosure.

Based on the D2D data transmission system shown in FIG. 1, an embodiment of the present disclosure further provides a D2D data transmission method. UE 1-*x* (it is assumed that the UE 1-*x* is any UE in n UEs 1) is used as an execution body for description. As shown in FIG. 6, the method includes the following steps.

Step S601: The UE 1-*x* receives a first message sent by UE 2, where the first message is used to indicate that the UE 2 needs to transmit data to a base station.

Step S602: The UE 1-*x* sends a second message to the UE 2, where the second message includes a user identity of the UE 1-*x* and/or status information of the UE 1-*x*.

Further, for a related explanation of the status information, refer to related description in step S203 in the embodiment shown in FIG. 2. Details are not described in this embodiment of the present disclosure.

Step S603: When the UE 1-*x* is determined as relay UE by the UE 2 according to the user identity of the UE 1-*x* and/or the status information of the UE 1-*x*, the UE 1-*x* receives the data sent by the UE 2 and transmits the data to the base station, where the relay UE is UE that transmits the data to the base station.

Further, for a specific implementation in which the UE 2 determines the UE 1-*x* as the relay UE according to the user identity of the UE 1-*x* and/or the status information of the UE 1-*x*, refer to description in the foregoing interaction embodiments. Details are not described herein.

Figure 7:
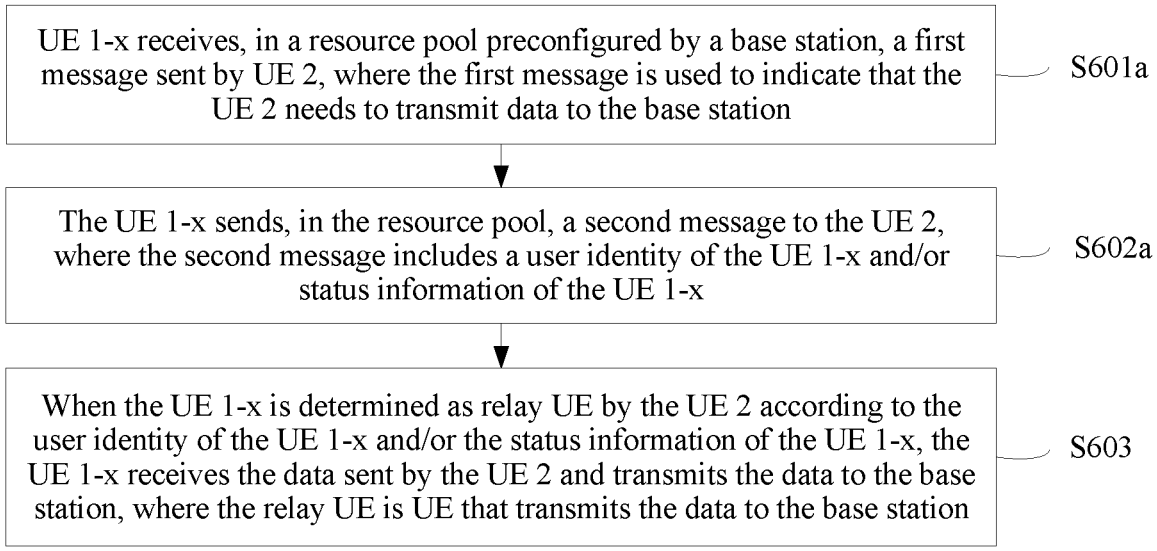
FIG. 7 is a fourth schematic flowchart of a D2D data transmission method according to an embodiment of the present disclosure.

Further, the base station may pre-configure a resource pool, and the UE 1-*x* may receive and send a message in the resource pool. That is, as shown in FIG. 7, that the UE 1-*x* receives a first message sent by UE 2 (step S601) may include the following step.

Step S601*a*: The UE 1-*x* receives, in the resource pool preconfigured by the base station, the first message sent by the UE 2, where the first message is used to indicate that the UE 2 needs to transmit data to the base station.

That the UE 1-x sends a second message to the UE 2 (step S602) may include the following step.

Step S602a: The UE 1-x sends, in the resource pool, the second message to the UE 2, where the second message includes a user identity of the UE 1-x and/or status information of the UE 1-x.

In order to avoid resource contention between the first message sent by the UE 2 and the second message sent by the UE 1-x, different resources in the resource pool preconfigured by the base station may be separately allocated to the UE 2 and the UE 1-x.

That is, the resource pool preconfigured by the base station includes a first resource and a second resource, the first resource is allocated to and used by the UE 2 to send the first message and receive the second message separately sent by each of the n UEs 1, and the second resource is allocated to and used by the n UEs 1 (including the UE 1-x) to send the second message and receive the first message.

Further, in the foregoing embodiments, the first message may further include an indication that the n UEs 1 need to feed back information.

Further, that the UE 1-x sends a second message to the UE 2 (step S602) may include the following.

The UE 1-x sends the second message to the UE 2 according to the indication that the n UEs 1 need to feed back information.

The indication for feeding back information may be include that information that needs to be fed back by each of the n UEs 1 includes the status information. This is not limited in this embodiment of the present disclosure.

The first message further includes a preset threshold that the status information of the n UEs 1 needs to meet.

Therefore, before the UE 1-x sends the second message to the UE 2 (step S602), the method may further include the following.

The UE 1-x determines, according to the preset threshold that the status information of the n UEs 1 needs to meet, whether the status information of the UE 1-x accords with the preset threshold.

That the UE 1-x sends a second message to the UE 2 may include the following.

If the status information of the UE 1-x accords with the preset threshold, the UE 1-x sends the second message to the UE 2.

Certainly, if the status information of the UE 1-x does not meet the preset threshold, the UE 1-x does not send the second message to the UE 2. This is not limited in this embodiment of the present disclosure.

For description about related examples and beneficial effects, refer to the foregoing interaction embodiments. Details are not described in this embodiment of the present disclosure.

Based on the D2D data transmission method provided in this embodiment of the present disclosure, after the UE 1-x (any UE in n candidate UEs in the network coverage area of the base station) receives the first message sent by the UE 2 (UE out of the network coverage area of the base station), the UE 1-x sends the second message to the UE 2. The second message includes the user identity of the UE 1-x and/or the status information of the UE 1-x. In this way, after receiving the n second messages from the n UEs 1, the UE 2 may determine the relay UE from the n UEs 1 according to the user identity of each of the n UEs 1 and/or the status information of each of the n UEs 1, and further transmit the data to the base station using the relay UE, where n is an integer not less than 2. That is, a solution below is provided. When there are usually a plurality of candidate UEs in network coverage, one suitable UE is found from the plurality of candidate UEs and used as relay UE to transmit information from UE out of network coverage to a base station. Therefore, this resolves a problem about how to find UE in network coverage that can be used as relay UE to transmit information from UE out of network coverage to a base station.

Figure 8:
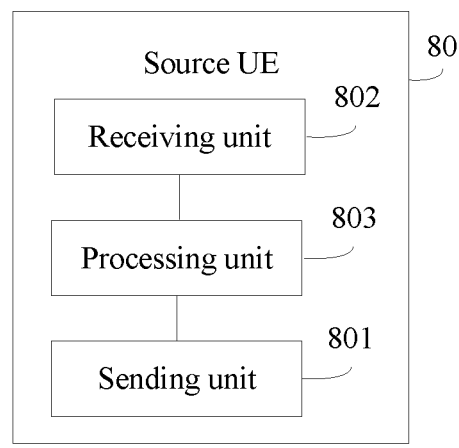
FIG. 8 is a first schematic structural diagram of source UE according to an embodiment of the present disclosure.

An embodiment of the present disclosure further provides source UE 80. As shown in FIG. 8, the source UE 80 includes a sending unit 801, a receiving unit 802, and a processing unit 803.

The sending unit 801 is configured to send a first message to n candidate UEs, where the first message is used to indicate that the source UE 80 needs to transmit data to a base station, the source UE 80 is UE out of a network coverage area of the base station, the n candidate UEs are UEs in the network coverage area of the base station, and n is an integer not less than 2.

The receiving unit 802 is configured to receive n second messages from the n candidate UEs, where each of the n candidate UEs sends one second message to the source UE 80, and the second message includes a user identity of each candidate UE and/or status information of each candidate UE.

The processing unit 803 is configured to determine relay UE from the n candidate UEs according to the user identity of each candidate UE and/or the status information of each candidate UE, where the relay UE is UE that transmits the data to the base station.

The sending unit 801 is further configured to transmit the data to the base station using the relay UE.

The sending unit 801 is further configured to send, in a resource pool preconfigured by the base station, the first message to the n candidate UEs.

The receiving unit 802 is further configured to receive, in the resource pool, the n second messages from the n candidate UEs.

The resource pool includes a first resource and a second resource, the first resource is allocated to and used by the source UE 80 to send the first message and receive the second message, and the second resource is allocated to and used by the n candidate UEs to send the second message and receive the first message.

In a possible implementation, the status information includes at least one or any combination of the following information, current memory usage, current power supply usage or remaining power, a processing capability of a CPU, a link status between the UE and the base station, or interference.

The first message includes an indication that the n candidate UEs need to feed back information.

The first message includes a preset threshold that the status information of the n candidate UEs needs to meet.

It should be noted that the sending unit 801 in this embodiment may be an interface circuit that has a transmit function and that is on the source UE 80, for example, a transmitter. The receiving unit 802 may be an interface circuit that has a reception function and that is on the source UE 80, for example, a receiver. The processing unit 803 may be a processor disposed independently, or may be integrated into a processor of the source UE 80. In addition, the processing unit 803 may be stored in a memory of the source UE 80 in a form of program code, and a processor of the source UE 80 calls and performs a function of the processing unit 803. The processor herein may be a CPU or an application-specific integrated circuit (ASIC), or one or more integrated circuits configured to implement this embodiment of the present disclosure.

Further, for the D2D data transmission method performed by the source UE 80 provided in this embodiment of the present disclosure, refer to the foregoing method embodiment. Details are not described in this embodiment of the present disclosure.

This embodiment of the present disclosure provides the source UE 80, and the source UE 80 is UE out of the network coverage area of the base station. After the source UE 80 sends the first message to the n candidate UEs in the network coverage area of the base station, the source UE 80 receives the n second messages from the n candidate UEs. Each of the n candidate UEs sends one second message to the source UE, and the second message includes the user identity of each candidate UE and/or the status information of each candidate UE. In this way, the source UE 80 may determine the relay UE from the n candidate UEs according to the user identity of each candidate UE and/or the status information of each candidate UE, and further transmit the data to the base station using the relay UE, where n is an integer not less than 2. That is, according to the source UE 80 provided in this embodiment of the present disclosure, when there are a plurality of candidate UEs in network coverage, one suitable UE may be found from the plurality of candidate UEs and used as relay UE to transmit information from UE out of network coverage to a base station. Therefore, this resolves a problem about how to find UE in network coverage that can be used as relay UE to transmit information from UE out of network coverage to a base station.

Figure 9:
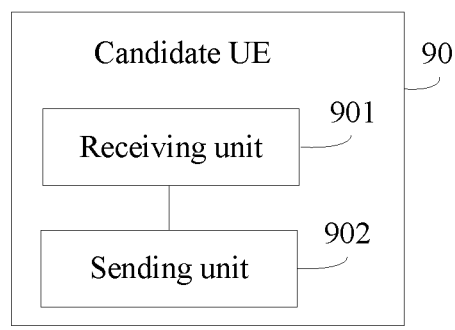
FIG. 9 is a first schematic structural diagram of candidate UE according to an embodiment of the present disclosure.

An embodiment of the present disclosure provides candidate UE 90. As shown in FIG. 9, the candidate UE 90 includes a receiving unit 901 and a sending unit 902.

The receiving unit 901 is configured to receive a first message sent by source UE, where the first message is used to indicate that the source UE needs to transmit data to a base station, the source UE is UE out of a network coverage area of the base station, the candidate UE 90 is UE in n candidate UEs 90 in the network coverage area of the base station, and n is an integer not less than 2.

The sending unit 902 is configured to send a second message to the source UE, where the second message includes a user identity of the candidate UE 90 and/or status information of the candidate UE 90.

The receiving unit 901 is further configured to receive the data sent by the source UE when the candidate UE 90 is determined as relay UE by the source UE according to the user identity of the candidate UE 90 and/or the status information of the candidate UE 90, where the relay UE is UE that transmits the data to the base station.

The sending unit 902 is further configured to transmit the data to the base station.

The receiving unit 901 is further configured to receive, in a resource pool preconfigured by the base station, the first message sent by the source UE.

The sending unit 902 is further configured to send, in the resource pool, the second message to the source UE.

The resource pool includes a first resource and a second resource, the first resource is allocated to and used by the source UE to send the first message and receive the second message, and the second resource is allocated to and used by the n candidate UEs 90 to send the second message and receive the first message.

In a possible implementation, the status information includes at least one or any combination of the following information, current memory usage, current power supply usage or remaining power, a processing capability of a CPU, a link status between the UE and the base station, or interference.

The first message includes an indication that the n candidate UEs 90 need to feed back information.

The first message includes a preset threshold that status information of the n candidate UEs 90 needs to meet.

It should be noted that the sending unit 902 in this embodiment may be an interface circuit that has a transmit function and that is on the candidate UE 90, for example, a transmitter. The receiving unit 901 may be an interface circuit that has a reception function and that is on the candidate UE 90, for example, a receiver.

Further, for the D2D data transmission method performed by the candidate UE 90 provided in this embodiment of the present disclosure, refer to the foregoing method embodiment. Details are not described in this embodiment of the present disclosure.

This embodiment of the present disclosure provides the candidate UE 90, and the candidate UE 90 is UE in the n candidate UEs in the network coverage area of the base station. After receiving the first message sent by the source UE, the candidate UE 90 sends the second message to the source UE. The second message includes the user identity of the candidate UE 90 and/or the status information of the candidate UE 90. In this way, after receiving the second messages sent by the n candidate UEs 90, the source UE may determine the relay UE from the n candidate UEs 90 according to the user identity of each candidate UE 90 and/or the status information of each candidate UE 90, and further transmit the data to the base station using the relay UE, where n is an integer not less than 2. That is, according to the candidate UE 90 provided in this embodiment of the present disclosure, when there are a plurality of candidate UEs 90 in network coverage, one suitable UE may be found from the plurality of candidate UEs 90 and used as relay UE to transmit information from UE out of network coverage to a base station. Therefore, this resolves a problem about how to find UE in network coverage that can be used as relay UE to transmit information from UE out of network coverage to a base station.

Figure 10:
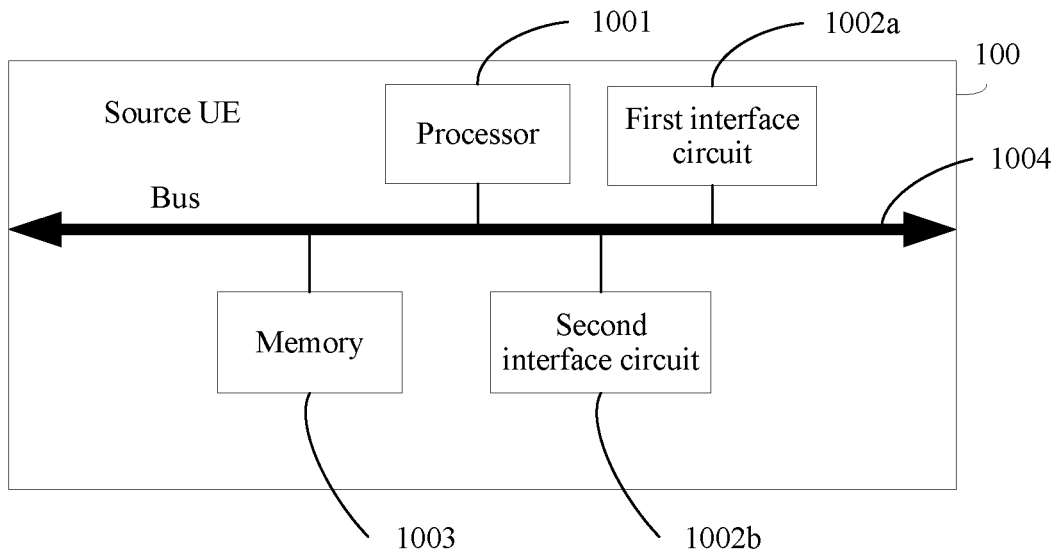
FIG. 10 is a second schematic structural diagram of source UE according to an embodiment of the present disclosure.

An embodiment of the present disclosure further provides source UE 100. As shown in FIG. 10, the source UE 100 includes a processor 1001, a first interface circuit 1002a, a second interface circuit 1002b, a memory 1003, and a bus 1004, and the processor 1001, the first interface circuit 1002a, the second interface circuit 1002b, and the memory 1003 are connected and complete mutual communication using the bus 1004.

It should be noted that the processor 1001 herein may be one processor, or may be a general term of a plurality of processing elements. For example, the processor 1001 may be a CPU, may be an ASIC, or one or more integrated circuits configured to implement this embodiment of the present disclosure, such as one or more microprocessors, a digital signal processor (DSP), or one or more field programmable gate arrays (FPGA).

The memory 1003 may be one storage apparatus or may be a general term of a plurality of storage elements, and is configured to store executable program code or a parameter, data, and the like that are required for running an access network management device. In addition, the memory 1003 may include a random access memory (RAM), or may include a non-volatile RAM (NVRAM), such as a magnetic disk memory or a flash memory.

The bus 1004 may be an industry standard architecture (ISA) bus, a Peripheral Component Interconnect (PCI) bus, an extended ISA (EISA) bus, or the like. The bus 1004 may be classified into an address bus, a data bus, a control bus, and the like. For ease of denotation, the bus 1004 is indicated using only one bold line in FIG. 10. However, it does not indicate that there is only one bus or only one type of bus.

The first interface circuit 1002a is configured to send a first message to n candidate UEs, where the first message is used to indicate that the source UE 100 needs to transmit data to a base station, the source UE 100 is UE out of a network coverage area of the base station, the n candidate UEs are UEs in the network coverage area of the base station, and n is an integer not less than 2.

The second interface circuit 1002b is configured to receive n second messages from the n candidate UEs, where each of the n candidate UEs sends one second message to the source UE 100, and the second message includes a user identity of each candidate UE and/or status information of each candidate UE.

The processor 1001 is configured to determine relay UE from the n candidate UEs according to the user identity of each candidate UE and/or the status information of each candidate UE, where the relay UE is UE that transmits the data to the base station.

The first interface circuit 1002a is further configured to transmit the data to the base station using the relay UE.

Further, the first interface circuit 1002a is further configured to send, in a resource pool preconfigured by the base station, the first message to the n candidate UEs.

The second interface circuit 1002b is further configured to receive, in the resource pool, the n second messages from the n candidate UEs.

The resource pool includes a first resource and a second resource, the first resource is allocated to and used by the source UE 100 to send the first message and receive the second message, and the second resource is allocated to and used by the n candidate UEs to send the second message and receive the first message.

In a possible implementation, the status information includes at least one or any combination of the following information, current memory usage, current power supply usage or remaining power, a processing capability of a CPU, a link status between the UE and the base station, or interference.

The first message includes an indication that the n candidate UEs need to feed back information.

The first message includes a preset threshold that the status information of the n candidate UEs needs to meet.

Further, for the D2D data transmission method performed by the source UE 100 provided in this embodiment of the present disclosure, refer to the foregoing method embodiment. Details are not described in this embodiment of the present disclosure.

This embodiment of the present disclosure provides the source UE, and the source UE 100 is UE out of the network coverage area of the base station. After the source UE 100 sends the first message to the n candidate UEs in the network coverage area of the base station, the source UE 100 receives the n second messages from the n candidate UEs. Each of the n candidate UEs sends one second message to the source UE 100, and the second message includes the user identity of each candidate UE and/or the status information of each candidate UE. In this way, the source UE 100 may determine the relay UE from the n candidate UEs according to the user identity of each candidate UE and/or the status information of each candidate UE, and further transmit the data to the base station using the relay UE, where n is an integer not less than 2. That is, according to the source UE 100 provided in this embodiment of the present disclosure, when there are a plurality of candidate UEs in network coverage, one suitable UE may be found from the plurality of candidate UEs and used as relay UE to transmit information from UE out of network coverage to a base station. Therefore, this resolves a problem about how to find UE in network coverage that can be used as relay UE to transmit information from UE out of network coverage to a base station.

Figure 11:
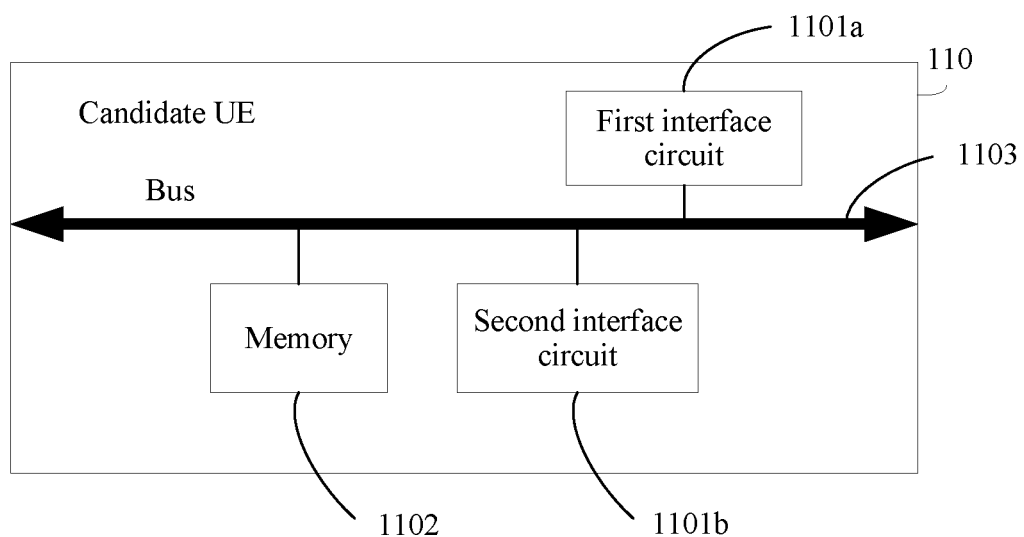
FIG. 11 is a second schematic structural diagram of candidate UE according to an embodiment of the present disclosure.

An embodiment of the present disclosure further provides candidate UE 110. As shown in FIG. 11, the candidate UE 110 includes a first interface circuit 1101a, a second interface circuit 1101b, a memory 1102, and a bus 1103, and the first interface circuit 1101a, the second interface circuit 1101b, and the memory 1102 are connected and complete mutual communication using the bus 1103.

It should be noted that the memory 1102 herein may be one storage apparatus, or may be a general term of a plurality of storage elements, and is configured to store executable program code or a parameter, data, and the like that are required for running an access network management device. In addition, the memory 1102 may include a RAM or an NVRAM, for example, a magnetic disk memory or a flash memory.

The bus 1103 may be an ISA bus, a PCI bus, an EISA bus, or the like. The bus 1103 may be classified into an address bus, a data bus, a control bus, and the like. For ease of denotation, the bus 1103 is indicated using only one bold line in FIG. 11. However, it does not indicate that there is only one bus or only one type of bus.

The first interface circuit 1101a is configured to receive a first message sent by source UE, where the first message is used to indicate that the source UE needs to transmit data to a base station, the source UE is UE out of a network coverage area of the base station, the candidate UE 110 is UE in n candidate UEs 110 in the network coverage area of the base station, and n is an integer not less than 2.

The second interface circuit 1101b is configured to send a second message to the source UE, where the second message includes a user identity of the candidate UE 110 and/or status information of the candidate UE 110.

The first interface circuit 1101a is further configured to receive the data sent by the source UE when the candidate UE 110 is determined as relay UE by the source UE according to the user identity of the candidate UE 110 and/or the status information of the candidate UE 110, where the relay UE is UE that transmits the data to the base station.

The second interface circuit 1101b is further configured to transmit the data to the base station.

The first interface circuit 1101a is further configured to receive, in a resource pool preconfigured by the base station, the first message sent by the source UE.

The second interface circuit 1101b is further configured to send, in the resource pool, the second message to the source UE.

The resource pool includes a first resource and a second resource, the first resource is allocated to and used by the source UE to send the first message and receive the second message, and the second resource is allocated to and used by the n candidate UEs 110 to send the second message and receive the first message.

In a possible implementation, the status information includes at least one or any combination of the following information, current memory usage, current power supply usage or remaining power, a processing capability of a CPU, a link status between the UE and the base station, or interference.

The first message includes an indication that the n candidate UEs 110 need to feed back information.

The first message includes a preset threshold that status information of the n candidate UEs 110 needs to meet.

Further, for the D2D data transmission method performed by the candidate UE 110 provided in this embodiment of the present disclosure, refer to the foregoing method embodiment. Details are not described in this embodiment of the present disclosure.

This embodiment of the present disclosure provides the candidate UE 110, and the candidate UE 110 is UE in the n candidate UEs 110 in the network coverage area of the base station. After receiving the first message sent by the source UE, the candidate UE 110 sends the second message to the source UE. The second message includes the user identity of the candidate UE 110 and/or the status information of the candidate UE 110. In this way, after receiving the second messages sent by the n candidate UEs 110, the source UE may determine the relay UE from the n candidate UEs 110 according to the user identity of each candidate UE 110 and/or the status information of each candidate UE 110, and further transmit the data to the base station using the relay UE, where n is an integer not less than 2. That is, according to the candidate UE 110 provided in this embodiment of the present disclosure, when there are a plurality of candidate UEs 110 in network coverage, one suitable UE may be found from the plurality of candidate UEs 110 and used as relay UE to transmit information from UE out of network coverage to a base station. Therefore, this resolves a problem about how to find UE in network coverage that can be used as relay UE to transmit information from UE out of network coverage to a base station.

In addition, a computer readable medium (or media) is further provided, including a computer readable instruction performing the operations in the method embodiments shown in FIG. 2 to FIG. 7 in the foregoing embodiments when the instruction is executed.

In addition, a computer program product is further provided, including the foregoing computer readable medium.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It may be clearly understood by persons skilled in the art that, for the purpose of convenient and brief description, in the apparatus described above, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
sending, by a source terminal comprising a first wireless user equipment (UE), using a resource in a resource pool preconfigured by a base station, a first message to n candidate terminals to discover the n candidate terminals, wherein the source terminal is out of a network coverage area of the base station, wherein the n candidate terminals are in the network coverage area of the base station, wherein the n candidate terminals are n wireless UEs, and wherein n comprises an integer not less than two;
receiving, by the source terminal using the resource in the resource pool, n second messages from the n candidate terminals, wherein each of the n second messages comprises status information of each of the n candidate terminals, wherein the status information comprises at least one or any combination of the following information:
- current memory usage;
- a processing capability of a central processing unit (CPU);
- a downlink reference signal received power (RSRP) of a link between each one of the n candidate terminals and the base station;
- a downlink signal to interference plus noise ratio (SINR) of the link between each one of the n candidate terminals and the base station; or
- an interference or noise status of a link between the n wireless UEs, determining, by the source terminal, a relay terminal from the n candidate terminals according to the status information of each of the n candidate terminals; and transmitting, by the source terminal, data to the base station using the relay terminal.

2. The data transmission method of claim 1, wherein the resource pool comprises different resources separately allocated to and used by the source terminal and the n candidate terminals.

3. The data transmission method of claim 1, wherein the source terminal determines the relay terminal according to the status information with reference to a preset policy specifying the following:
- when the status information includes the current memory usage, the source terminal selects the relay terminal having a smallest current memory usage ratio;
- when the status information includes the processing capability of the CPU, the source terminal selects the relay terminal having a strongest processing capability;
- when the status information includes the RSRP, the source terminal selects the relay terminal having a strongest downlink RSRP; and
- when the status information includes the SINR, the source terminal selects the relay terminal having a strongest downlink SINR.

4. The data transmission method of claim 1, wherein the first message comprises an indication that each of the n candidate terminals needs to feed back information.

5. The data transmission method of claim 1, wherein the first message comprises a preset threshold that the status information of each of the n candidate terminals needs to meet.

6. The data transmission method of claim 1, wherein the resource pool is preconfigured by the base station to facilitate device-to-device (D2D) communication between the source terminal and the n candidate terminals.

7. A data transmission method, comprising:
receiving, by a candidate terminal using a resource in a resource pool preconfigured by a base station, a first message from a source terminal, wherein the first message discovers the candidate terminal, wherein the source terminal is out of a network coverage area of a base station, wherein the candidate terminal is one of n candidate terminals in the network coverage area of the base station, wherein the source terminal is a wireless user equipment (UE) and the candidate terminal is a second wireless UE, and wherein n comprises an integer not less than two;
sending, by the candidate terminal using the resource in the resource pool, a second message to the source terminal, wherein the second message comprises status information of the candidate terminal, wherein the status information comprises at least one or any combination of the following information:
- current memory usage;
- a processing capability of a central processing unit (CPU);
- a downlink reference signal received power (RSRP) of a link between each one of the n candidate terminals and the base station;
- a downlink signal to interference plus noise ratio (SINR) of the link between each one of the n candidate terminals and the base station; or
- an interference or noise status of a link between the first and second wireless UEs, receiving, by the candidate terminal, data from the source terminal; and transmitting the data to the base station when the candidate terminal is used as a relay terminal by the source terminal.

8. The data transmission method of claim 7, wherein the resource pool comprises different resources separately allocated to the candidate terminal and the source terminal.

9. The data transmission method of claim 7, wherein the first message comprises an indication that the candidate terminal needs to feed back information.

10. The data transmission method of claim 7, wherein the first message comprises a preset threshold that the status information of the candidate terminal needs to meet.

11. A source terminal that comprises a first user equipment (UE) and that is located out of a network coverage area of a base station, the source terminal comprising:
a transmitter configured to send, using a resource in a resource pool preconfigured by the base station, a first message to n candidate terminals located in the network coverage area of the base station to discover the n candidate terminals, wherein the n candidate terminals are n wireless UEs, and wherein n comprises an integer not less than two;
a receiver configured to receive, using the resource pool, n second messages from the n candidate terminals, wherein the n second messages comprise status information of each of the n candidate terminals, and wherein the status information comprises at least one or any combination of the following information:
- current memory usage;
- a processing capability of a central processing unit (CPU);
- a downlink reference signal received power (RSRP) of a link between each one of the n candidate terminals and the base station;
- a downlink signal to interference plus noise ratio (SINR) of the link between each one of the n candidate terminals and the base station; or
- an interference or noise status of a link between the n wireless UEs, a processor coupled to the receiver and the transmitter and configured to determine a relay terminal from the n candidate terminals according to the status information of each candidate terminal, wherein the transmitter is further configured to transmit data to the base station using the relay terminal.

12. The source terminal of claim 11, wherein the resource pool comprises different resources separately allocated to the source terminal and the n candidate terminals.

13. The source terminal of claim 11, wherein the first message comprises an indication that each of the n candidate terminals needs to feed back information.

14. The source terminal of claim 11, wherein the first message comprises a preset threshold that the status information of each of the n candidate terminals needs to meet.

15. The source terminal of claim 14, wherein the preset threshold that the status information of each of the n candidate terminals needs to meet is such that:
when the status information includes the current memory usage, the current memory usage needs to be less than the preset threshold;
when the status information includes the processing capability, the processing capability needs to be greater than the preset threshold;
when the status information includes the RSRP, the downlink RSRP needs to be greater than the preset threshold; and
when the status information includes the SINR, the downlink SINR needs to be greater than the preset threshold.

* * * * *

UNITED STATES PATENT AND TRADEMARK OFFICE
CERTIFICATE OF CORRECTION

PATENT NO. : 10,609,743 B2  
APPLICATION NO. : 15/758613  
DATED : March 31, 2020  
INVENTOR(S) : Xiaocui Li and Kai Xu Page 1 of 1

It is certified that error appears in the above-identified patent and that said Letters Patent is hereby corrected as shown below:

On the Title Page

Page 2, 2nd Column, Other Publications, 3rd Line: "Jun. 15, 2013, 64 pages" should read "February 2013, 64 pages"

Page 2, 2nd Column, Other Publications, 6th Line: "Jun. 15, 2013, 9 pages" should read "February 2013, 9 pages"

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*